Figure 7:
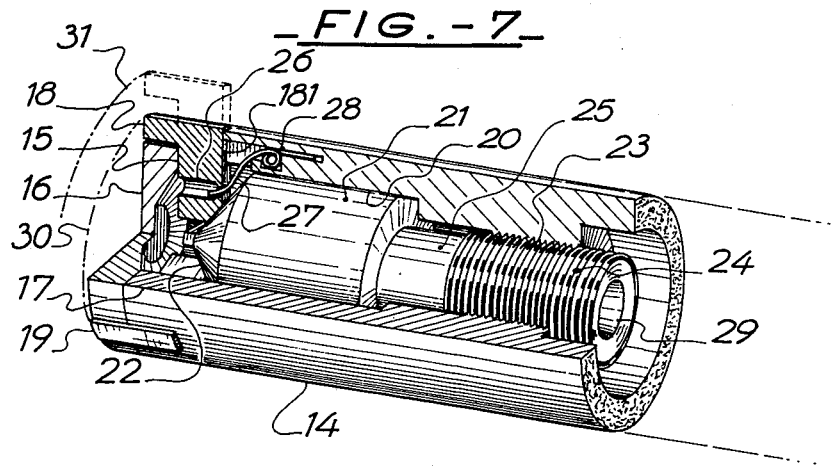

United States Patent [19]

Lendi et al.

[11] 4,118,867
[45] Oct. 10, 1978

[54] MICROMETER HEAD FOR INTERNAL MEASUREMENT INSTRUMENT

[75] Inventors: Georges Lendi, Crissier; Nicolae Voinescu, Lausanne; Rene De Trey, Bussigny, all of Switzerland

[73] Assignee: Tesa S.A., Vaud, Switzerland

[21] Appl. No.: 808,550

[22] Filed: Jun. 21, 1977

[30] Foreign Application Priority Data

Jun. 23, 1976 [CH] Switzerland .......................... 8006/76
Jun. 2, 1977 [CH] Switzerland .......................... 6751/77

[51] Int. Cl.$^2$ .............................................. G01B 5/08
[52] U.S. Cl. .................................. 33/164 C; 33/178 R
[58] Field of Search ................ 33/164 C, 170, 178 R, 33/174 Q, 164 R, 164 D

[56] References Cited

U.S. PATENT DOCUMENTS

| 2,604,703 | 7/1952 | Meyer | 33/178 R |
| 2,661,540 | 12/1953 | Dulligan | 33/178 R |

*Primary Examiner*—Richard E. Aegerter
*Assistant Examiner*—Willis Little
*Attorney, Agent, or Firm*—Anthony J. Casella

[57] ABSTRACT

In a micrometer head for an instrument for measuring internal dimensions there is included a casing in which at least one measurement contact piece having an inclined base is radially mounted in a slot or groove. The contact piece is driven by the axial displacement of a measuring cone and is maintained in contact with the inclined lateral surface of the cone by means of a return member. The axial displacement of the measuring cone, the base of which is guided in an axial cylindrical recess of the casing, is effected by the thrust of a spindle which has a micrometer screw mounted thereon, the screw being engaged in a threaded member connected to the casing. The cone and spindle have coaxial axes of rotation, and the cone, spindle and micrometer screw are so arranged that the path of movement of the inclined base of the contact piece on the cone is in the form of a tapered ramp having a long length and shallow inclination, the movement being caused by the combined axial and rotational movement of the cone. The cross section of the spiral ramp is formed at least by the contact line of the inclined base of the contact piece with the cone.

10 Claims, 15 Drawing Figures

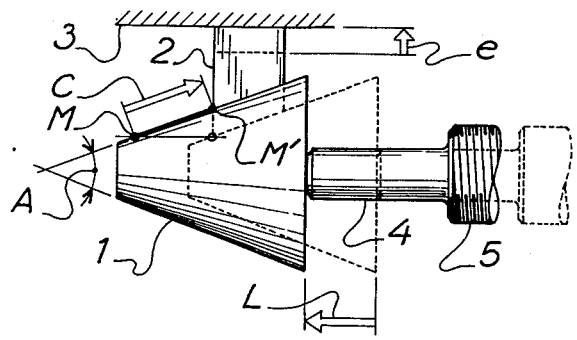
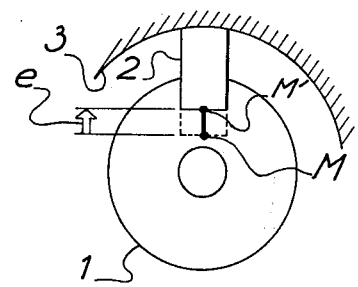
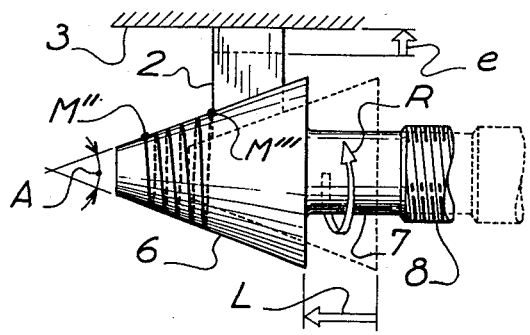
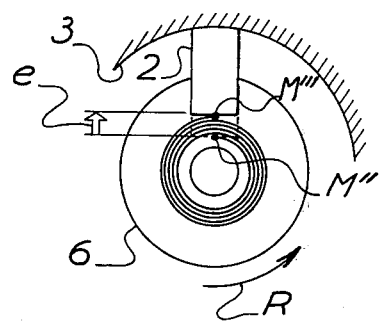
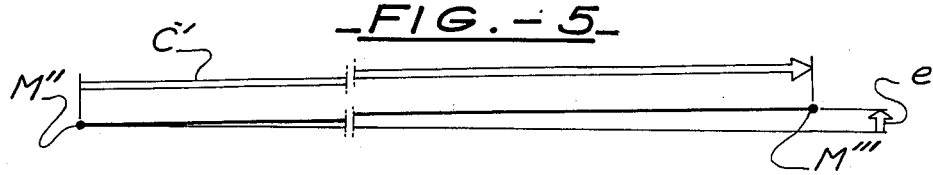
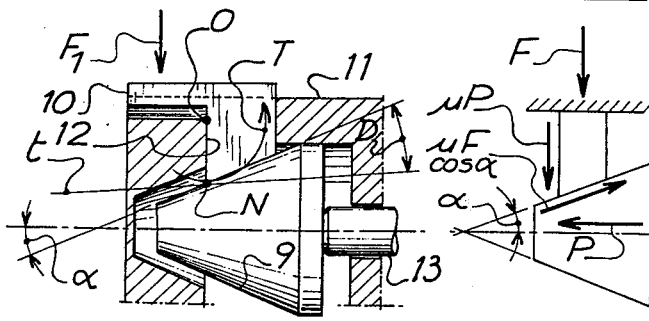
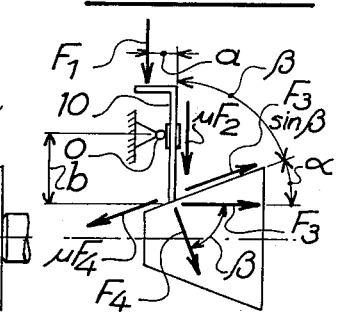

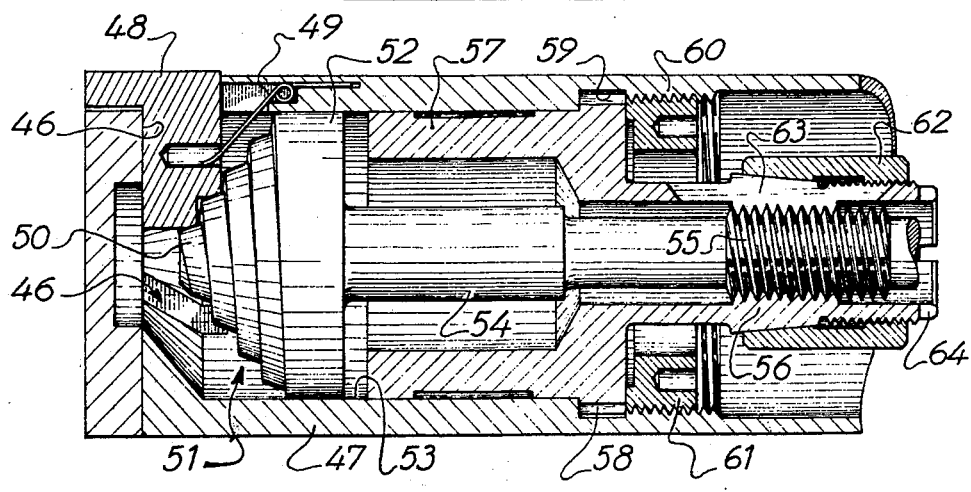
FIG. -14-
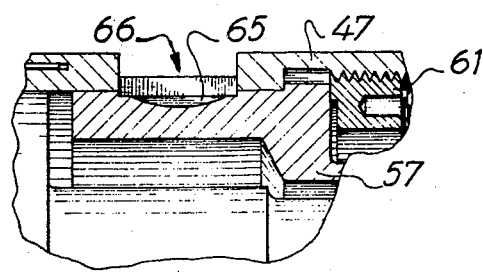
FIG. -15-

MICROMETER HEAD FOR INTERNAL MEASUREMENT INSTRUMENT

The present invention relates to a micrometer head for instruments utilised for measuring internal dimensions such as the diameter of bores or blind holes or internal threads provided in high precision mechanical parts or tools.

Micrometer heads of this general type are known. In particular, one such micrometer head has a casing in which at least one measuring contact piece having an inclined base is radially mounted and is displaced by the action of axially displacing a measuring cone, on the inclined surface of which the said contact piece is held in contact by means of a return member. The axial displacement of the measuring cone, the base of which is guided in an axial cylindrical recess in the casing, is achieved by the thrust of a spindle having a micrometer screw for axial displacement and measurement engaged in a threaded element connected to the casing, the cone and the spindle being co-axial, and the spindle being intended to be connected to the display member of the measuring instrument.

This measuring head has the advantage of preventing the measurement contact piece from swinging, which may occur due to the operational play in the assembling of the contact piece in its slide, or due to the fact that the zone of contact of the contact piece with the inner wall of the part to be measured in not centred in the slide or if this contact piece comprises a displaced feeler head for the measurement of blind holes.

This advantage is inherent in the use of a cone, on the inclined lateral surface of which the measuring contact piece may bear by the close contact of its inclined base in a line of contact forming a re-entrant angle with the tangent to the circle defined by the circular trajectory of swing of at least one point on the inclined surface. This line of contact, materialised by the generatrix of contact of the measurement cone, then forms an abutment preventing the swinging of the contact piece, the efficiency of said abutment being the more ensured, the greater the angle at the tip of the cone.

This advantage is valuable, since it contributes to a large extent to the accuracy of the measurements taken.

However, the use of a measurement cone for displacing the contact piece by sliding on its inclined surface, in the manner of a wedge, has the disadvantage of requiring the application of a strong thrust to move the contact piece. This may cause rapid wear on these two members which are in contact with each other, the amount of relative displacement of the contact piece on the cone being necessarily very short. Moreover, these disadvantages become worse as the apex angle of the cone is increased, since this disadvantage may extend to preventing radial displacement of the contact piece.

On the other hand, it has not previously been thought possible to increase the angle at the tip of the cone without adversely affecting the sensitivity of the measuring instrument. In such a case, the relationship between the axial displacement of the cone caused by the advance of the micrometer measurement screw and the radial displacement of the contact piece becomes unfavourable.

In order to avoid these disadvantages to a certain extent, some known measurement cones have a relatively small apex angle permitting only slight displacement of the contact piece, thus limiting the measuring capacity of the instrument. It is also not generally possible to lengthen the cone if the instrument is to be used for measuring blind holes, for obvious reasons. It has therefore not been considered possible simultaneously to increase the angle at the tip of the measuring cone to prevent the swinging of the contact piece and increase the capacity of the measuring instrument, and whilst avoiding premature wear on the contact piece and the cone and maintaining the sensitivity of the instrument, since these two objects are seemingly incompatible.

According to the present invention there is provided a micrometer head for an instrument for measuring internal dimensions comprising a casing in which at least one measurement contact piece having an inclined base is radially mounted in a slot or groove, which contact piece is driven by axial displacement of a measuring cone, the contact piece being maintained in contact with the inclined lateral surface of the cone by means of a return member, the axial displacement of the measuring cone, the base of which is guided in an axial cylindrical recess of the case, being effected by the thrust of a spindle having a micrometer screw mounted thereon, the screw being engaged in a threaded member connected to the casing, the cone and the spindle having co-axial axes of rotation and the spindle being connectable to a display member for the measurement instrument, wherein the measuring cone, the spindle and the micrometer screw comprise an at least angular link, so that the path of movement of the inclined base of the contact piece on the measurement cone is in the form of a tapered spiral ramp having a long length and shallow inclination which movement is caused by the combined axial and rotational movements of the measuring cone, the cross-section of said spiral ramp being formed at least by the contact line of the inclined base of the contact piece with the cone.

Reference will now be made to accompanying drawings in which certain Figures illustrate the prior art whilst the other Figures illustrate embodiments of the present invention, these drawings being given solely by way of example.

FIGS. 1 and 2 show, respectively, a longitudinal view and a somewhat schematic front view of part of a micrometer head of the prior art.

Figure 8:
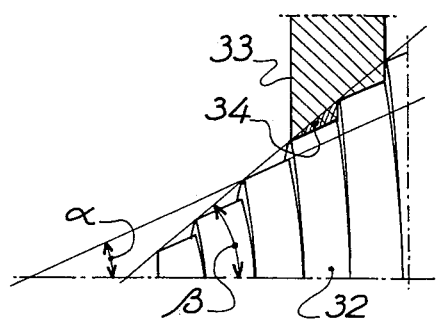
Figure 9:
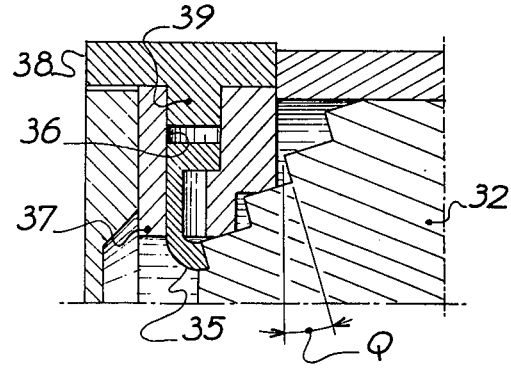
Figure 13:
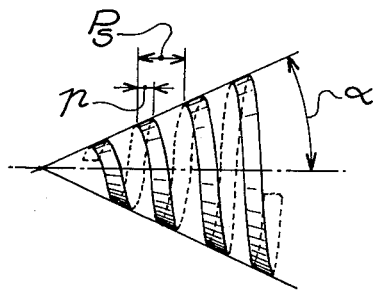
Figure 10:
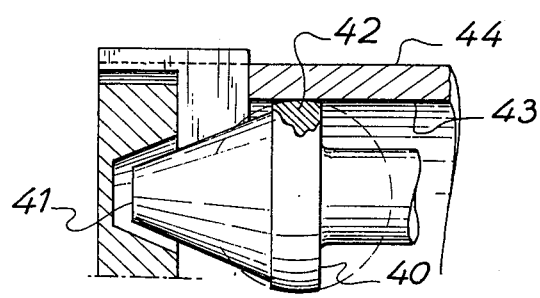

FIGS. 3 and 4 are views corresponding to FIGS. 1 and 2 respectively of a micrometer head according to the present invention, FIG. 5 is a development of the spiral path M'' M''' shown in FIGS. 3 and 4, FIG. 6 is a schematic longitudinal view, partially in section, of a further prior art micrometer head, FIG. 7 is a perspective view, of a micrometer head in accordance with the present invention, one-quarter thereof having been cut away to show interior detail, FIG. 8 is a schematic longitudinal view of part of a modified micrometer head in accordance with the present invention, FIGS. 9 and 10 are, respectively, partial longitudinal sections of two further modifications of a micrometer head in accordance with the present invention, FIGS. 11, 12 and 13 are schematic diagrams illustrating the forces acting during operation of the instrument of the present invention, FIG. 14 shows an axial section through a further embodiment of the present invention, and FIG. 15 is a partial axial section of a variant of a detail of part of the device shown in FIG. 14.

In FIGS. 1 and 2 there is shown a known micrometer head comprising a measuring cone 1, a measuring contact piece 2 having an inclined base, and a spindle 4 for a micrometer screw 5, which micrometer is utilised for determining internal measurement.

The casing for the head has not been shown for reasons of clarity. However, the case comprises a longitudinally extending radial slot or groove in which the measurement contact piece 2 is slideably displaceable. The head also includes an axial guide member for the measurement cone 1 and for spindle 4, as well as a threaded member in which the micrometer screw 5 is engaged.

To simplify FIGS. 1 to 7, only one measurement contact piece is shown. Some instruments of this type have two diametrically opposed contact points, whilst others have three or more contact points. Accordingly, all references hereinafter to one contact point should be construed as extending to a plurality of such points.

In FIGS. 1 and 2 the measurement contact piece 2 is shown, in full lines, in contact with the wall surface 3 of an internal bore, the diameter of which corresponds to the maximum measurement capable of being determined by the instrument. The positions of the parts of the instrument when the minimum measurement capable of being measured by the instrument is being determined are shown in broken lines.

By screwing of the screw 5 into the threaded member forming part of the case, the measurement cone 1, under the influence of the spindle 4 is axially displaced. This axial displacement of the measurement cone has the same effect as radially displaces the measurement contact piece. The contact piece 2 is moved outwardly by the cone 1 until it contacts the wall 3. Further movement of the cone does not cause further outward movement of the piece 2.

For a predetermined apex angle A at the tip of the cone 1, a set amount of radial movement $e$ of the measurement contact piece is obtained for a particular axial displacement L of the spindle by means of the micrometer screw. These three values being directly dependent as is the amount of sliding movement C of the contact point of the measurement contact piece 2, with the surface distance MM' of the cone.

It is clear that, for a fixed axial displacement L of the measurement cone 1, the amount of radial movement $e$ of the measurement contact piece 2 will increase as the angle A is increased, and vice versa. However, it is not possible to solely rely on these values in designing such a micrometer head since if the apex angle A is made too great in an attempt to increase the field of use of the instrument, there is caused premature wear on the contact surfaces, due to excessive contact pressure between the contact piece 2 and the cone 1. Such a large angle would necessitate the application of substantial force to the cone to move the contact piece, the more so as the sliding movement C of the contact piece and the cone relative to one another reduces as the angle A of the cone is increased.

By referring to the diamgram in FIG. 11 and utilising the formula $$P = F \, tg \, \alpha + \mu F \cos \alpha + \mu P \text{ (where } \alpha = A/2)$$

it will be seen that for a bearing force F of the contact piece 2 on the part to be measured 3 of 1.8 kg and assuming a co-efficient of friction ($\mu$) of 0.19 between the contact piece 2 and the cone 1, the force required to be applied to push the cone in order to move the contact piece varies from 1.650 kg when $\alpha = 30°$ through 2.200 kg when $\alpha = 40°$ to 4.100 kg when $\alpha = 60°$.

The contact pressure $P_C$ of the contact piece on the cone, determined for these last two values of P, which were given by way of example only is 23 kg/mm$^2$ $y$ $\alpha = 40°$ and 100 kg/mm$^2$ when $\alpha = 60°$. These values have been obtained utilising the formula $P_C = (0.175 \times PE/lr)^{\frac{1}{2}}$ and by taking E (the modules of elasticity) as 21,100 kg/mm$^2$, $r$ (the radius of the cone) as 1.5 mm and $l$ (the length of the contact surface) as 1 mm.

Even if a contact pressure of 23 kg/mm$^2$ obtained when the angle $\alpha = 40°$, is acceptable, a contact pressure of 100 kg/mm$^2$ obtained when the angle $\alpha = 60°$ is clearly greater than the maximum load admissible for metals from which the cone and the contact piece are usually made. Accordingly, an apex half-angle of 60° cannot be utilised without quickly causing deterioration of the contact surfaces of the contact piece and the cone. It will also be noted that if the apex angle A (which equals 2 $\alpha$) is large the amount of displacement L of the micrometer screw 5 required to cause a movement $e$ of the contact piece unfavourably affects the sensitivity of the measuring instrument.

It has therefore not appeared possible to provide a measuring instrument of this type which simultaneously provides excellent sensitivity over a wide measuring range since, in theory, one of these criteria is achieved by utilising a small apex angle A whilst the other is achieved by providing a large apex angle A.

In FIGS. 3 and 4, there is shown a measuring instrument in accordance with the present invention which comprises a measurement cone 6, a measurement contact piece 2 and a micrometer screw 8 having the same characteristics as the corresponding features of the prior art instrument shown in FIGS. 1 and 2. In the instrument shown in FIGS. 3 and 4, an axial displacement L of the measurement cone 6 still causes the same radial movement $e$ of the measurement contact piece 2.

However, the spindle 7 of the instrument shown in FIGS. 3 and 4 is positively connected to the measurement cone 6 and the micrometer screw 8, as compared with the simple abutment shown in the device of FIGS. 1 and 2. Accordingly, the measurement cone 6 is not only displaced axially by axial displacement of the micrometer screw 8 but also rotates when the screw 8 and spindle 7 are angularly displaced by an amount R.

Accordingly the path of sliding movement C' (best seen in FIG. 5) of a particular point of the measurement contact piece 2 on the measurement cone 6 is no longer linear, as is the path MM' shown in FIG. 1, but is, instead, in the form of a conical spiral MM" M'" (see FIGS. 3 and 4). In FIG. 5, there is shown a development of this spiral which, as can readily be seen, uniformly increases with constant slope.

The drawings in FIGS. 1 to 5 are on substantially the same scale as one another and it can be clearly seen that the force required to displace the contact piece is reduced since this latter is, effectively, moved up a very long ramp having a very shallow slope as compared with the short linear movement C and steep incline of the same members in known instruments as shown in FIGS. 1 and 2. This advantage means that a better ratio of the apex angle A of the cone to the amount movement L of the micrometer screw in order to simultaneously obtain an increase in the measurement capacity of the instrument whilst retaining high sensitivity can be selected. In particular, a larger apex angle can be selected of the cone for the same axial displacement of the micrometer screw.

By increasing the apex angle of the cone swinging movement of the measurement contact piece is more efficiently damped.

This effect is shown, in an exaggerated manner, in FIG. 6. In this Figure, there is shown a measurement cone 9 of a known type and a measurement contact piece having an off-set feeler head 10, both of which are located in a casing 11. The casing 11 has a longitudinally extending radial slot or groove 12 in which the contact piece is displaced. The measurement cone 9 is axially displaced by means of a spindle 13 acted upon by a micrometer screw (not shown). The off-set feeler head 10 is provided for the internal measurement of blind bores. Under the effect of the thrust of the spindle 13, the measurement cone 9 pushes against the measurement contact piece, and the off-set feeler head 10 thereof bears against the wall of the blind bore. It is thus subjected to a reaction force $F_1$, the line of action of which is displaced relative to the axis of the radial groove 12. Since there must be some play present due to the necessity of assembling of the contact piece in its slot or groove this force has the effect of trying to pivot the contact piece round the bearing limit point 0 on the front edge of the radial slot or groove 12.

If the angle of incline $\alpha$ on the support base of the contact piece, which angle corresponds to one-half the apex angle of the cone, is sufficiently large, the circular trajectory T of swing of at least one point, for example, the point N on the inclined base of the contact piece will be re-entrant into the cone, this beig shown by the fact that a re-entrant angle D is formed by the tangent $t$ taken to the point N on the circle defined by the circular trajectory of swing T, the circle having the point 0 as its centre, and by the line of contact line of the inclined base of the contact piece with the cone. The surface of the cone along this line of contact thus forms an abutment which prevents the contact piece from swinging. This effect becomes more pronounced as the apex angle at the tip of the cone is increased and the resistance to sliding of the contact piece on the cone, which also negates the swinging tendency, is also increased.

This latter effect is illustrated in FIG. 2, in which the contact piece 10 is shown swinging about a pivot forming the pivot point 0 on which pivot the contact piece can slide vertically when the support base thereof slides on the cone.

It will be seen that, under the effect of the force $F_1$ acting parallel to the axis of the contact piece but at a distance $a$ therefrom, the support base of the contact piece, when pivoting about the point 0, tends to ride up the surface of the cone. The point 0 is spaced at a distance $b$ from the surface of the cone.

To ensure that the contact piece cannot swing, it is necessary to satisfy the equation:

$$F_3 \sin \beta = \mu F_4 + \mu F_2$$

in which $\beta = 90° - \alpha$
$F_2 = 2F_1$
$F_3 = F_1 a/b$
and
$F_4 = F_1 a \cos \beta / b$ In this equation, the co-efficient of friction ($\mu$) is taken as $$\mu = \frac{\frac{a}{b} \cos \alpha}{\frac{a}{b} \sin \alpha + 2}$$

If, as is usually the case in practice, it is assumed that $a = 1$ mm and $b = 2$ mm, $\mu$ can be evaluated at 0.19, 0.16 and 0.10 if the angle $\alpha$ is 30°, 40° and 60° respectively.

This means that to ensure that the contact piece cannot swing, the co-efficient of friction of the contact piece on the cone can theoretically be reduced if the angle $\alpha$ is increased. Since, in practice, $\mu$ remains constant, the resistance of the contact piece to sliding on the cone increases as the angle $\alpha$ is increased.

The micrometer head shown in FIG. 7 utilises the above-mentioned considerations. In this Figure, the micrometer head is provided with a casing 14 which has three radial slots or grooves 15, only one of which is shown, the three slots or grooves being at angles of 120° from one another. The ends of these slots are defined by a cover member 16 secured by screws (not shown) to the wall 17 of the casing at the end thereof. The slots or grooves are delimited at their inner ends by the base portion 181 of notches formed in the wall 17.

In each of these slots or grooves, one of three measurement contact pieces, two of which 18 and 19, are shown, slides radially.

A cylindrical recess 20 forms a continuation of these slots or grooves within the casing 14 in which the cylindrical base 21 of a measurement cone 22 is guided. The interior of the casing 14 also includes a threaded portion 23 on which the screw-threaded portion 24, of the shaft or journal 25 of the displacement and measurement micrometer screw is engaged. This screw is integrally formed with the cylindrical base 21 of the measurement cone 22.

Each of the measurement contact pieces has a cylindrical recess 26 formed therein, one end of a return spring 27 engaging in one end thereof. The spring is made of steel wire and has a coil 28 formed therein adjacent the other end thereof, which coil 28 engages in a recess formed in the casing 14.

The spring 27 is provided to keep each measurement contact piece in contact with the measurement cone when the latter is axially withdrawn into its case, towards the right as shown in FIG. 7.

At its end remote from the contact pieces, the displacement and measurement micrometer screw comprises a threaded blind bore having a tapered inlet 29 for receiving the threaded end of a connecting rod which links the cone 22, the shaft or journal 25 and the measurement screw threaded portion 24 with the display member of the measuring instrument.

The cone 22, the spindle 25 and the screw threaded portion 24 are co-axial and with one another rigidly connected together, so that the measurement contact pieces are displaced by the measurement cone 22 over a path of the type described above and shown in FIGS. 3, 4 and 5.

FIG. 7 also shows in dotted lines the outermost position of the measurement contact piece 18 in order to illustrate the scope of use of the measuring instrument which is from the minimum diameter 30 to the maximum diameter 31. For example, the difference between these two diameters may be as much as 10 mm, the instrument being capable of measuring any diameter from 20 to 30 mm, which is particularly advantageous.

In FIG. 8, there is shown a variant of a measurement cone 32, the cone having an apex half-angle $\beta$, the angle $\beta$ being greater than the angle $\alpha$, which enables the cone to have the advantages of high sensitivity and low contact pressure which would be inherent in a cone having the smaller apex half-angle $\alpha$. In this embodiment the inclined base of the measurement contact piece 33 comprises two adjacent contact zones in a stepped arrangement each inclined at the angle $\alpha$ which is smaller than the angle $\beta$ of the cone 32. This angle $\alpha$ must be sufficiently large, for reasons described with reference to FIG. 6, to retain the already described advantage of preventing swinging of the contact piece. In this case, a groove having a base 34 and being of substantially triangular cross-section (cross-hatched in FIG. 8) is cut into the solid surface of the measurement cone, to provide a tapering spiral ramp as described above. The contact zones move along this path. In a simplified variant, not shown, a single inclined zone inclined at an angle $\alpha$ which is less than that of the cone itself is formed on the base of the measurement contact piece, this single zone being capable of having reduced dimensions and being locatable at any position on the inclined base of a contact piece. However, it is usually located in the central region thereof for stability reasons.

This variant has been designed specifically for maximising the range of use of a micrometer head according to the present invention, in particular for measuring blind bores. The theory will be apparent from FIG. 13.

On a cone having a small half-angle $\alpha$ fulfilling the requirements of minimal contact pressure between the contact piece and the cone, whilst still preventing the contact piece from swinging, a tapered spiral is described having a pitch $P_s$ and a contact surface $p$ having a width equal to the contact surface of the contact piece which width is smaller than the pitch $P_s$ of the spiral.

This spiral of width $p$ is then compressed so as to reduce the pitch $P_s$ of the spiral until it is equal to the width $p$. This deformation is effected in such a manner that the angle of incline $\alpha$ of this surface remains the same relative to the axis of the cone.

By so doing, a geometrical configuration is obtained formed by a tapered spiral having a pitch P, the spiral having a tapered surface of width $p$ equal to the pitch. The tapered spiral is then inscribed in a cone having an apex half-angle $\beta$ greater than the angle $\alpha$ as has been described with reference to FIG. 8.

Finally, this construction is given a helicoidal movement having a pitch equal to the pitch P of the spiral, the effect of which is to radially advance the contact piece on a cone having a larger angle $\beta$ so as to make possible a wider range of measurement whilst retaining the advantages of minimum contact pressure and force transmission associated with a cone of a smaller angle $\alpha$.

This particular configuration provides a triangular groove for the movement of the measuring contact piece may be utilised with advantage in the embodiment shown in FIG. 9. In this embodiment, the re-entrant angle Q relative to a normal to the longitudinal axis of the measurement cone is formed by removing more material from the base of the groove. This arrangement makes it possible to use alternative means for retaining the contact piece instead of the spring 27 utilised in the micrometer head shown in FIG. 7.

In this Figure, the retaining member is in the form of a spur 35 which is force-fitted in a radial recess 36 formed in the measurement contact piece. This latter comprises two parts, a base portion 37 and a feeler head 38 including a nipple 39, which latter is also force-fitted in the recess 36.

This spur 35 may be either rigidly mounted, as shown in FIG. 9, or may be resiliently mounted in order to ensure automatic disengagement in the case of malfunctioning of the instrument, for example, too rapid a recoil of the measurement cone. In the embodiment shown in FIG. 10, the base 40 of the measurement cone 41 is in the form of a portion of a sphere, the maximum circular diameter of this portion 42 being substantially equal to the diameter of the recess 43 formed in the casing 44 of the micrometer head. This particular configuration increases the useful life of the instrument since it considerably reduces the friction caused by rotation of the cone in its recess. This configuration may also be applied to the embodiment shown in FIG. 8.

In the embodiment shown in FIG. 14, the micrometer head is provided with a measurement cone having a tapered spiral ramp as described with reference to FIGS. 8 and 13, and has an adjustment system which is intended to facilitate accurate in situ axial positioning of the tapered spiral ramp beneath the inclined bearing zones of the measurement contact piece.

The micrometer head shown in FIG. 14 comprises three displaceble contact pieces 48, of the type described hereinbefore, engaged in three radial slots or grooves 46 formed in the casing 47. The base of one displaceable contact piece 48 is shown as comprising two inclined contact zones supported by a spring 49 on two adjacent turns of a tapered spiral ramp 50 having a constant pitch inscribed in the wall of a measurement cone 51.

The measurement cone 51 has a cylindrical base 52 which is axially guided in cylindrical recess 53 formed in the casing 47. This measurement cone projects towards the interior of the casing 47 by the intermediary of a driving spindle 54 which includes a measuring micrometer screw 55 having the same pitch as the tapered spiral ramp 50.

The measuring micrometer screw 55 is thus axially and rotationally connected by virtue of its construction, to the measurement cone 51. The screw is engaged in the threaded portion 56 of a cylindrical sleeve 57 which is rotatably mounted in the cylindrical recess 53.

The cylindrical sleeve 57 includes a shoulder portion 58 which engages in a circular groove 59 formed in the wall of the casing. The groove includes a coaxial threaded extension portion 60 which receives a threaded locking ring 61 which locks the shoulder 58 of the sleeve in the groove 59.

In order to allow the introduction of the sleeve 57 into the cylindrical recess 53, channels are formed in the threaded portion 60 and the shoulder 58. However, if the thickness of the wall of the casing is sufficient to give the threaded portion 60 a larger diameter than the base of the groove 59, these channels are unnecessary.

The threaded portion 56 of the cylindrical sleeve 57 which receives the measurement micrometer screw 55 incorporates a play take-up system formed by a tapered locking ring 62 which engages in radial slots 63 formed in a zone of the threaded portion.

The end of the cylindrical sleeve 57 remote from the measurement cone 51 has an engagement member formed thereon in the form of a frontal notched portion 64 which is utilised for rotating the member.

During the setting-up of the instrument or, indeed, at a desired moment, a clamping ring 61 is merely in sliding contact with the shoulder 58 of the sleeve 57 by providing, for example, a key having wards which engage in holes formed in the ring so as to permit rotation of the said sleeve without any axial play relative to the casing 47. The spindle 54 is thereafter kept in a fixed angular position relative to the casing 47. At such time, any rotational movement transmitted to the sleeve 57, for example, by means of a key having suitable wards engaging in the end notches 64 of the sleeve, has the effect of axially advancing or withdrawing, depending upon the direction of rotation, the micrometer screw 55 and hence the cone, the tapered spiral ramp 50 of which moves below the inclined bearing zones of the measurement contact piece 48. These movements occur with optimum precision, since they are effected by a precision micrometer screw.

It is thus possible to advance the cone until adjacent turns of its spiral ramp come into contact with the two inclined contact zones of the contact measurement piece. The cone can then be withdrawn by an amount corresponding to the desired operational play. This latter operation can be easily monitored by angularly displacing the sleeve by a fraction of a turn corresponding to the said operational play. When such adjustment has been effected, the locking ring 61 is locked in order to immobilise the sleeve 57 in the casing 47.

It will be observed that this method of adjusting the axial positioning of the measurement cone under the contact piece may obviously be utilised to obtain a fine zeroing adjustment of the instrument.

In a variant of the embodiment shown in FIG. 15, the member which engages the cylindrical sleeve 57 and is intended to cause its rotation has peripheral notches effected by the milling of channels 65 on a circular region of its side surface. An opening 66 is formed in the wall of the case 47 opposite these notches.

This makes it possible to avoid the simultaneous introduction of the means for rotating the sleeve 57 and the locking means of the lock nut 61 in the same position within the casing 47. It also makes it possible, if desired, to monitor the amount angular displacement of the sleeve 57 in the casing 47 by counting the number of channels 65 which are made to pass the edge of the opening 66.

In another embodiment (not shown), the angular immobilisation of the sleeve 57 in the casing 47 may be effected independently of its axial immobilisation. Thus a radial locking screw engaged in a threaded hole in the wall of the casing may be utilised.

This method of achieving in situ adjustment of the axial position relative to the measurement contact piece and the tapered spiral ramp is advantageous for, without it, it is not possible to effect adjustment once the micrometer screw is in engagement with the threaded member of the casing and is rigidly connected thereto. Very precise pre-adjustment would, in such cases, be necessary which is undesirable.

In fact, since the pitch of the tapered spiral ramp is necessarily equal to the pitch of the micrometer screw connected to the driving spindle, the relative axial position of the spiral section in contact with the inclined support zone of the measurement contact piece does not vary during the axial displacement of the measurement cone under the contact piece, since such axial displacement can only be effected by simultaneously rotating the micrometer screw in the threaded member of the casing.

what we claim is:

1. A micrometer head for an instrument for measuring internal dimensions, comprising:
    (a) a casing having at least a radial slot formed therein;
    (b) at least one radial measuring key, said measuring key slidably mounted within said radial slot;
    (c) a threaded member connected to said casing;
    (d) a spindle having a coaxial measuring micrometer screw connected thereto, said micrometer screw engaged in said threaded member;
    (e) a cone means coaxial to said spindle, said cone means at least angularly connected to said spindle;
    (f) a stepped inclined base means on said measuring key for contact thereof with said cone means, said inclined base means comprising at least one contact zone inclined at an angle ($\alpha$) less than the angle ($\beta$) of the generitricies of said cone means with respect to the rotation axis thereof;
    (g) a tapered spiral ramp on said cone means providing a path of contact for said contact zone, said tapered spiral ramp path of contact constituted by the base of a groove having a cross-section which forms an acute-angled triangle with the generitricies of said cone means; and
    (h) return means for maintaining said contact zone of said measuring key in contact with said groove base path of contact of said cone means, such that high sensitivity and low contact pressure exist between said cone and said measuring key.

2. A micrometer head according to claim 1, wherein the wall of said groove which delimits each of its turns from the following turn thereof is inclined and forms in cross-section a re-entrant angle, and wherein said return means is secured to the measuring key and engaged within said re-entrant angle wall.

3. A micrometer head according to claim 2, wherein said return means is a rigid retaining spur rigidly fixed to said measuring key.

4. A micrometer head according to claim 2, wherein said return means is a resilient retaining spur.

5. A micrometer head according to claim 2, wherein said measuring key comprises a base portion including a recess, a retaining spur slipped and fixed in said recess, and a feeler head comprising a fixing nipple also slipped and fixed in said recess.

6. A micrometer head according to claim 1, wherein said threaded member is a cylindrical sleeve internally threaded over at least part of its length, said sleeve being rotatably mounted within a cylindrical housing of said casing, said sleeve being furthermore axially connected to said casing and comprising an engaging means for rotational displacement thereof and a blocking means for its locking in the casing.

7. A micrometer head according to claim 6, wherein said cylindrical sleeve is axially connected to said casing by a member locking its angular position.

8. A micrometer head according to claim 6, wherein said cylindrical sleeve comprises a shoulder portion engaged in a circular groove of said cylindrical housing in said casing, and wherein said circular groove is extended by a coaxial threaded portion in which is engaged a threaded ring locking said shoulder within said groove.

9. A micrometer head according to claim 6, wherein said engaging means of said cylindrical sleeve comprise a notched portion disposed at its end opposed to said cone means.

10. A micrometer head according to claim 6, wherein said engaging means of said cylindrical sleeve comprises a peripheral notching disposed on an annular zone of its lateral surface, and wherein the wall of said cylindrical housing of said casing comprises a window means formed over said peripheral notching.

* * * * *